(12) United States Patent
Martinez et al.

(10) Patent No.: US 12,344,492 B2
(45) Date of Patent: Jul. 1, 2025

(54) INDIVIDUAL ZONE TENSION CONTROL

(71) Applicant: Goodrich Corporation, Charlotte, NC (US)

(72) Inventors: Cameron L. Martinez, Pueblo, CO (US); Neil R. Ramsey, Pueblo, CO (US)

(73) Assignee: Goodrich Corporation, Charlotte, NC (US)

( * ) Notice: Subject to any disclaimer, the term of this patent is extended or adjusted under 35 U.S.C. 154(b) by 390 days.

(21) Appl. No.: 17/897,738

(22) Filed: Aug. 29, 2022

(65) Prior Publication Data

US 2024/0067482 A1 Feb. 29, 2024

(51) Int. Cl.
  *B65H 23/00* (2006.01)
  *B29C 70/56* (2006.01)
  *B65H 23/04* (2006.01)

(52) U.S. Cl.
  CPC .......... *B65H 23/044* (2013.01); *B29C 70/56* (2013.01)

(58) Field of Classification Search
  CPC ........ B65H 23/044; B29C 70/56; B29B 11/16
  See application file for complete search history.

(56) References Cited

U.S. PATENT DOCUMENTS

| | | | |
|---|---|---|---|
| 7,891,597 B1 | 2/2011 | Henson | |
| 8,152,089 B2 | 4/2012 | Shin et al. | |
| 9,914,610 B2* | 3/2018 | Mabuchi | B65H 23/192 |
| 10,865,068 B2 | 12/2020 | Dion et al. | |
| 2003/0177923 A1* | 9/2003 | Iwanaga | B65H 23/1888 |
| | | | 101/228 |
| 2013/0248634 A1* | 9/2013 | Vonderheiden | B65H 23/048 |
| | | | 242/615.1 |
| 2018/0022563 A1* | 1/2018 | Liang | B65H 23/044 |
| | | | 242/419.1 |
| 2018/0326621 A1 | 11/2018 | Martin et al. | |
| 2019/0210251 A1 | 7/2019 | Fabre et al. | |
| 2020/0048023 A1* | 2/2020 | Lucas | B65H 23/044 |
| 2021/0087011 A1* | 3/2021 | Hada | B65H 23/063 |
| 2022/0128132 A1 | 4/2022 | Bedord et al. | |
| 2023/0264915 A1* | 8/2023 | Park | B65H 18/10 |
| | | | 242/413 |

FOREIGN PATENT DOCUMENTS

| | | | |
|---|---|---|---|
| FR | 3066429 | 11/2018 | |
| GB | 1577313 | 10/1980 | |
| KR | 20200086362 A | * 7/2020 | ........... B65H 23/044 |

OTHER PUBLICATIONS

European Patent Office, European Search Report dated Jan. 18, 2024 in Application No. 23192072.9.
European Patent Office, European Office Action dated Jan. 15, 2025 in Application No. 23192072.9.

* cited by examiner

*Primary Examiner* — Emmanuel M Marcelo
(74) *Attorney, Agent, or Firm* — SNELL & WILMER L.L.P.

(57) ABSTRACT

A system for controlling tension on textile material used in forming a preform is disclosed herein. The system includes a sensor and a controller, where the controller is configured to: receive a signal, from the sensor, indicative of a compressive force applied by the textile material feeding into the system; determine whether the compressive force is within range of a setpoint of the tension for the textile material; and responsive to the compressive force being outside the range, send a command of at least one of an increase or a decrease of the tension on the textile material.

18 Claims, 9 Drawing Sheets

INDIVIDUAL ZONE TENSION CONTROL

FIELD

The present disclosure relates generally to controlling individual tensioning of textile material in respective zones when forming a preform.

BACKGROUND

Composite bodies are utilized in various industries, including the aerospace industry. The composite bodies start with a preform that is formed using layers of textile material. When running through the preform forming machine, textile material naturally arrives at the preform forming machine with varying tensions causing variation in the final preform product.

SUMMARY

According to various embodiments of the present disclosure, a system for controlling tension on textile material used in forming a preform is provided. The system includes a sensor; and a controller, where the controller is configured to: receive a signal, from the sensor, indicative of a compressive force applied by the textile material feeding into the system; determine whether the compressive force is within range of a setpoint of the tension for the textile material; and responsive to the compressive force being outside the range, send a command of at least one of an increase or a decrease of the tension on the textile material.

In various embodiments, the sensor is at least one of a load cell or a strain gauge. In various embodiments, the sensor is located between a front bar and a back bar of a forming machine and the compressive force is the textile material acting on at least one of the back bar, the front bar, a structure associated with the back bar, or a structure associated with the front bar.

In various embodiments, the system further includes a double bar tensioner, where the tension is provided by the double bar tensioner. In various embodiments, the double bar tensioner comprises a first cylindrically shaped portion and a second cylindrically shaped portion, where a first end of the first cylindrically shaped portion and a first end of the second cylindrically shaped portion are coupled to a first side structure, and where a second end of the first cylindrically shaped portion and a second end of the second cylindrically shaped portion are coupled to a second side structure.

In various embodiments, the system further includes a tensioner motor, where the double bar tensioner is coupled to the tensioner motor and where the tensioner motor rotates the double bar tensioner along a central axis between the first cylindrically shaped portion and the second cylindrically shaped portion to either increase or decrease the tension on the textile material. In various embodiments, rotating the double bar tensioner clockwise along the central axis increases the tension on the textile material and rotating the double bar tensioner counterclockwise along the central axis decreases the tension on the textile material. In various embodiments, rotating the double bar tensioner counterclockwise along the central axis increases the tension on the textile material and rotating the double bar tensioner clockwise along the central axis decreases the tension on the textile material.

In various embodiments, the system further includes a signal amplifier, where the signal is an analog signal and where the signal amplifier amplifies the analog signal prior to being received by the controller. In various embodiments, the system further includes a digital-to-analog converter; and a signal amplifier, where the signal is a digital signal, where the digital-to-analog converter converts the digital signal to an analog signal, and where signal amplifier amplifies the analog signal prior to being received by the controller.

Also disclose herein is a method for controlling tension on textile material used in forming a product. The method includes receiving, by a controller, a signal indicative of a compressive force applied by the textile material feeding into a forming machine; determining, by the controller, whether the compressive force is within range of a setpoint of a tension for the textile material; and responsive to the compressive force being outside the range, sending, by the controller, a command of at least one of an increase or a decrease of the tension on the textile material.

In various embodiments, the signal is received from a sensor and the sensor is at least one of a load cell or a strain gauge. In various embodiments, the sensor is located between a front bar and a back bar of the forming machine and the compressive force is the textile material acting on at least one of the back bar, the front bar, a structure associated with the back bar, or a structure associated with the front bar.

In various embodiments, the tension is provided by a double bar tensioner. In various embodiments, the double bar tensioner comprises a first cylindrically shaped portion and a second cylindrically shaped portion, where a first end of the first cylindrically shaped portion and a first end of the second cylindrically shaped portion are coupled to a first side structure, and where a second end of the first cylindrically shaped portion and a second end of the second cylindrically shaped portion are coupled to a second side structure. In various embodiments, the double bar tensioner is coupled to a tensioner motor, where the tensioner motor rotates the double bar tensioner along a central axis between the first cylindrically shaped portion and the second cylindrically shaped portion to either increase or decrease the tension on the textile material. In various embodiments, rotating the double bar tensioner clockwise along the central axis increases the tension on the textile material and rotating the double bar tensioner counterclockwise along the central axis decreases the tension on the textile material. In various embodiments, rotating the double bar tensioner counterclockwise along the central axis increases the tension on the textile material and rotating the double bar tensioner clockwise along the central axis decreases the tension on the textile material.

In various embodiments, the signal is an analog signal and the analog signal is amplified prior to being received by the controller. In various embodiments, the signal is a digital signal and the digital signal is converted to an analog signal and then amplified prior to being received by the controller.

DETAILED DESCRIPTION

Figure 1:
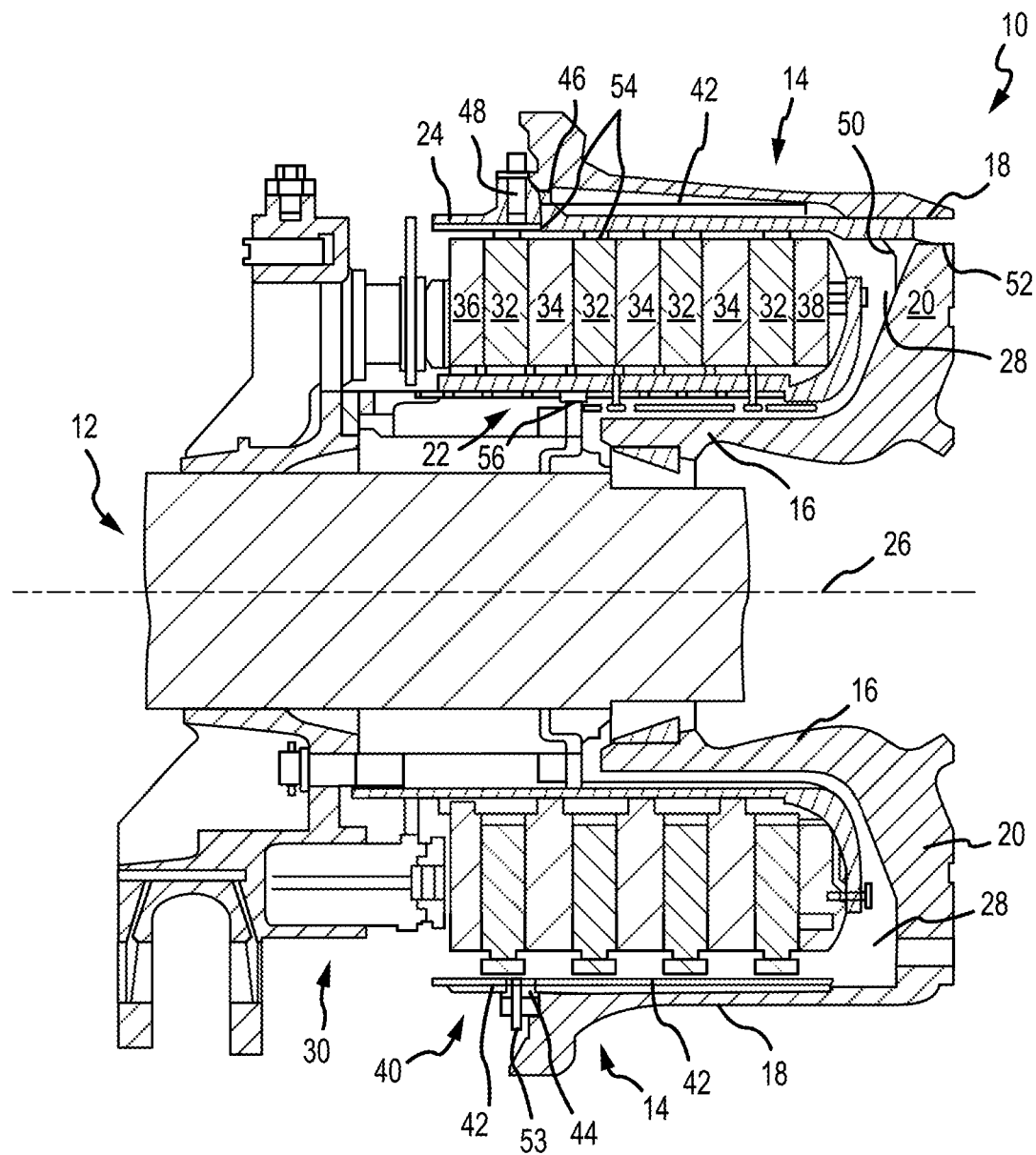
FIG. 1 illustrates a cross sectional view of an aircraft wheel braking assembly, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an," or "the" may include one or more than one and that reference to an item in the singular may also include the item in the plural. Further, all ranges may include upper and lower values and all ranges and ratio limits disclosed herein may be combined.

In some current preform forming systems, textile material may pass over a set of rollers designed to keep the textile material at a same tension as the preform material travels through the preform forming machinery. However, in such preform forming machinery, textile material wrapping may occur where the textile material wraps around the rollers causing tears in the textile material and thereby creating poor quality preforms, breaking rollers, etc. In some current preform forming systems, such rollers have been removed and the textile material is routed through a series of directional changes to provide tensioning. However, anytime the textile material routing is changed, the textile material properties may change. The effects of changing the routing are amplified if an inlet roller is in an undesirable position while the preform forming machinery is running. If the inlet roller is not properly adjusted to help guide the textile material through a loom of the preform forming machinery, an outlet roller may pull the textile material through the preform forming machinery without the inlet rollers grabbing the textile material. Also, if the tension on the textile material is greater than the gripping force of the inlet roller, the textile material may slip between the inlet roller changing a needling effect on the textile material as it passes through the loom of the preform forming machinery.

Disclosed herein are systems and methods for individually tensioning each textile material used in forming a preform. In current preform forming systems, tensioning may be applied to all textile materials used in forming the preform at a predetermined setpoint, which fails to account for differences and variation in each of the textile materials. Accordingly, in various embodiments, the systems and methods disclosed herein monitor a compressive force applied by each textile material as the textile material is pulled into the preform forming machinery. In various embodiment, the systems and methods analyze the compressive force of each textile material and apply individual tensioning, where desired, to account for variations in the textile material so that the materials are pulled into the preform forming machinery thereby reducing variations in the formed preform.

Referring now to FIG. 1, in accordance with various embodiments, aircraft wheel braking assembly such as may be found on an aircraft, is illustrated. In various embodiments, aircraft wheel braking assembly 10 may include a bogie axle 12, a wheel 14 including a hub 16 and a wheel well 18, a web 20, a torque take-out assembly 22, one or more torque bars 24, a wheel rotational axis 26, a wheel well recess 28, an actuator 30, multiple brake rotors 32, multiple brake stators 34, a pressure plate 36, an end plate 38, a heat shield 40, multiple heat shield sections 42, multiple heat shield carriers 44, an air gap 46, multiple torque bar bolts 48, a torque bar pin 50, a wheel web hole 52, multiple heat shield fasteners 53, multiple rotor lugs 54, and multiple stator slots 56.

In various embodiments, the various components of aircraft wheel braking assembly 10 may be subjected to the application of compositions and methods for protecting the components from oxidation.

Brake disks (e.g., interleaved rotors 32 and stators 34) are disposed in wheel well recess 28 of wheel well 18. Rotors 32 are secured to torque bars 24 for rotation with wheel 14, while stators 34 are engaged with torque take-out assembly 22. At least one actuator 30 is operable to compress interleaved rotors 32 and stators 34 for stopping the aircraft. In this example, actuator 30 is shown as a hydraulically actuated piston, but many types of actuators are suitable, such as an electromechanical actuator. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows rotation of wheel 14. Torque take-out assembly 22 is secured to a stationary portion of the landing gear truck such as a bogie beam or other landing gear strut, such that torque take-out assembly 22 and stators 34 are prevented from rotating during braking of the aircraft.

Carbon-carbon composites (also referred to herein as composite structures, composite substrates, and carbon-carbon composite structures, interchangeably) in the friction disks may operate as a heat sink to absorb large amounts of kinetic energy converted to heat during slowing of the aircraft. Heat shield 40 may reflect thermal energy away from wheel well 18 and back toward rotors 32 and stators 34. Heat shield 40 is attached to wheel 14 and is concentric with wheel well 18. Individual heat shield sections 42 may be secured in place between wheel well 18 and rotors 32 by respective heat shield carriers 44 fixed to wheel well 18. Air gap 46 is defined annularly between heat shield segments 42 and wheel well 18.

Torque bars 24 and heat shield carriers 44 can be secured to wheel 14 using bolts or other fasteners. Torque bar bolts 48 can extend through a hole formed in a flange or other mounting surface on wheel 14. Each torque bar 24 can optionally include at least one torque bar pin 50 at an end opposite torque bar bolts 48, such that torque bar pin 50 can be received through wheel web hole 52 in web 20. Heat shield sections 42 and respective heat shield carriers 44 can then be fastened to wheel well 18 by heat shield fasteners 53.

Figure 2A:
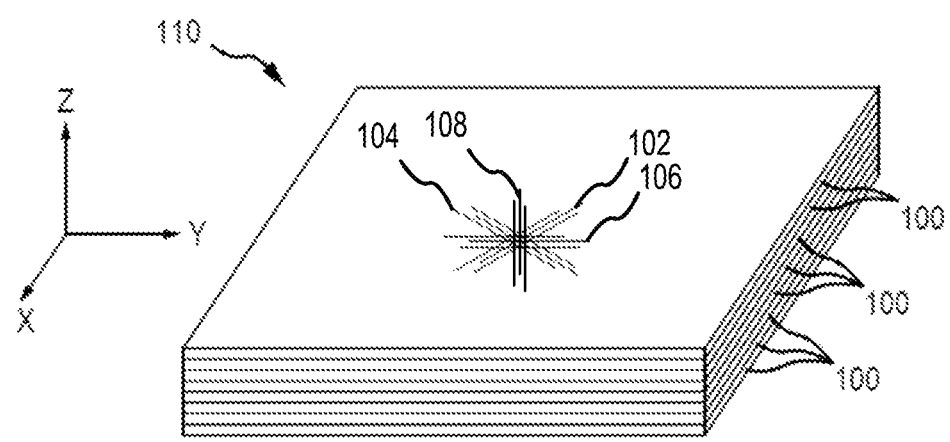
FIG. 2A illustrates a perspective of fibrous preform, in accordance with various embodiments.

Referring now to FIG. 2A, in accordance with various embodiments, a fibrous preform is illustrated. Fibrous preform 110 may comprise a plurality of sheets of fabric 100 stacked together. Sheets of fabric 100 may all be oriented in a common direction so that their respective plurality of fibers (i.e., first plurality of fibers 102, second plurality of fibers 104, third plurality of fibers 106, and/or fourth plurality of fibers 108) are commonly oriented, or may be alternatingly rotated so that their respective plurality of fibers extend in different direction in a crisscross pattern. Fibrous preform 110 may comprise one or more layers of a non-woven fabric, one or more layers of a woven fabric (e.g., plain weave, 5-harness satin weave, 8-harness satin weave, etc.), or combinations thereof. Fibrous preform 110 may comprise PAN or OPF fibers extending in three directions and leaving a plurality of pores or open spaces and may be prepared for shape-forming, compression, and carbonization. In various embodiments, fibrous preform 110 is formed by stacking layers of PAN or OPF fibers and superimposing the layers (e.g., by stacking sheets of fabric 100). The layers may be needled perpendicularly to each other (i.e., along the Z-direction) with barbed, textile needles or barbless, structuring needles. In various embodiments, the layers are needled at an angle of between 0° and 60° (e.g., 0°, 30°, 45°, and/or 60° with respect to the Z-direction to each other. The needling process generates a series of z-fibers through fibrous preform 110 that extend perpendicularly to the fibrous layers. The z-fibers are generated through the action of the needles pushing fibers from within the layer (x-y or in-plane) and reorienting them in the z-direction (through-thickness). Needling of the fibrous preform may be done as one or more layers are added to the stack or may be done after the entire stack of layers is formed. The needles may also penetrate through only a portion of fibrous preform 110, or may penetrate through the entire fibrous preform 110. In addition, resins are sometimes added to fibrous preform 110 by either injecting the resin into the preform following construction or coating the fibers or layers prior to forming the fibrous preform 110. The needling process may take into account needling parameters optimized to maintain fiber orientation, minimize in-plane fiber damage, and maintain target interlaminar properties. After needling the fibrous preform 110, the fibrous preform 110 may be both compressed to higher fiber volume ratio and formed to shape in a single-step shape-forming process; though it is also contemplated that in various embodiments the fibrous preform 110 is compressed and shape formed without undergoing the needling process.

Figure 2B:
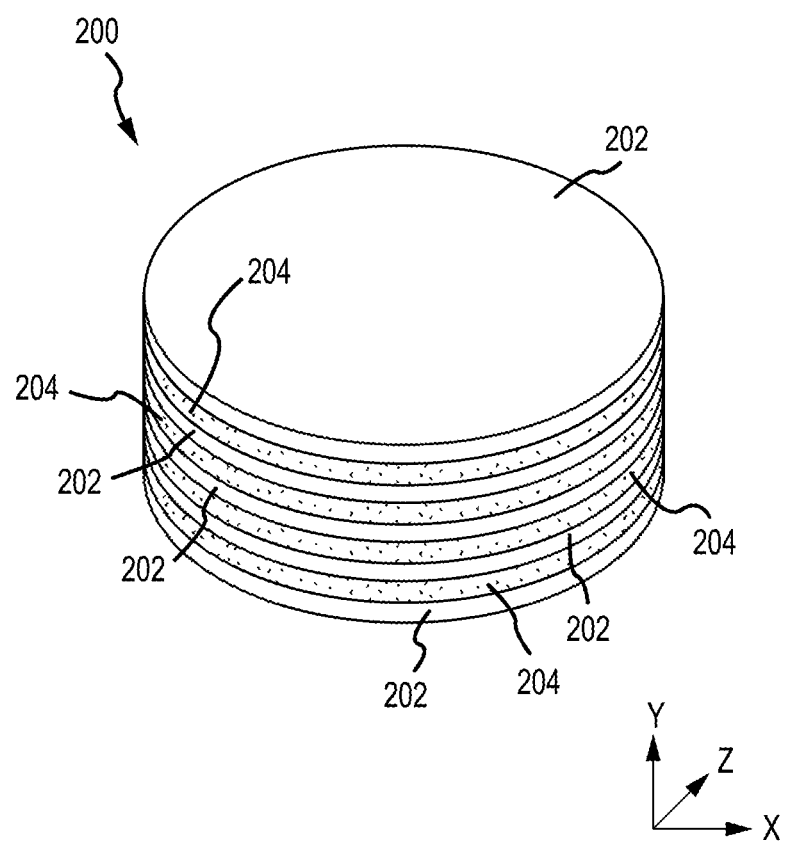
FIG. 2B illustrates a fibrous preform, in accordance with various embodiments.

Referring now to FIG. 2B, in accordance with various embodiments, a fibrous preform 200 is illustrated. Fibrous preform 200 may be employed to form a leading-edge surface or other aerospace component, as described above. Although illustrated as comprising a round shape, it is contemplated and understood that fibrous preform 200 may comprise any desired shape, such as square, rectangular, polygonal, ovular, circular, or any other shape as desired. Fibrous preform 200 may comprise a stacked plurality of textile layers 202. Each textile layer in the textile layers 202 has a first dimension in the thickness direction (e.g., as measured along the direction of the Y-axis) that may be substantially less than the dimensions of the textile layer in the textile layers 202 in the lateral and transverse directions (e.g., as measured along directions of the X-axis and Z-axis, respectively).

In accordance with various embodiments, textile layers 202 include woven, braided, entangled, or knitted carbon fibers. In various embodiments, one or more of the textile layers 202 may comprise silicon carbide fibers or boron fibers. In various embodiments, one or more of the textile layers 202 may comprise carbon fibers in an open weave pattern (i.e., a weave where there is increased distance between the warp tows and between the weft tows). In various embodiments, one or more of the textile layers 202 may comprise stretch-broken carbon fibers. Stretch-broken fibers are generally made by stretching a fiber bundle until the individual fibers break or fracture into multiple fragments. During the stretch-breaking process, the fibers in a carbon tow are pulled, causing a more or less regular pattern of breakage. The individual filaments, still quite long and aligned with one another, have some freedom to move independently. As a result, individual tows may be conformed to a contour or wrapped around a corner more easily, because fibers on the tow's outside radius can separate at the breaks, allowing the material to be conformed to deep draws and complex contours. Stretch-broken fibers may take a form of aligned discontinuous fiber. Stretch-broken fibers provide flexibility to form complex shapes while maintaining comparable strength and stiffness to that of continuous fibers. Employing stretch-broken fibers tends to increase the bonding or securing of the matrix material during CVI/CVD within the textile layers of the fibrous preform. Employing stretch-broken carbon fibers tends to increase the bonding or securing of the ceramic particles (e.g., SiC) within the textile layer and the composite part. In various embodiments, the carbon fibers may be derived from polyacrylonitrile (PAN), rayon (synthetic fiber derived from cellulose), oxidized polyacrylonitrile fiber (OPF), carbon pitch, or the like. The starting fiber may be pre-oxidized PAN or fully carbonized commercial carbon fiber. The textile layers 202 may be formed or cut having any desired shape or form. For example, although illustrated as having a round shape, it is contemplated and understood that the textile layers 202 may have any desired shape such as, for example, a polygon, circular, triangular, square, rectangular, pentagonal, hexagonal, octagonal, among others. In various embodiments, textile layers 202 and fibrous preform 200 may have a generally planar geometry or a non-planar geometry (e.g., a complex 3D shape).

Fibrous preform 200 is a lay-up of textile layers 202. In accordance with various embodiments, fibrous preform 200 includes one or more ceramic particle layers 204. Each ceramic particle layer in the one or more ceramic particle layers 204 is located between a pair of textile layers 202 adjacent to one another. In various embodiments, ceramic particle layers 204 may be comprised of silicon carbide particles. A range of particle sizes (or powder sizes) may be employed in the ceramic powders used to fabricate the ceramic particle layers 204. For example, in various embodiments, a silicon carbide powder between 100 grit and 500 grit may be selected for ceramic particle layers 204. In various embodiments, a silicon carbide powder between 200 grit and 500 grit may be selected for ceramic particle layers 204. In various embodiments, a silicon carbide powder between 250 grit and 450 grit may be selected for ceramic particle layers 204. In various embodiments, a silicon carbide powder between 400 grit and 500 grit may be selected for ceramic particle layers 204. Stated differently, the silicon carbide particles may have an average particle size between about 35 micrometers (μm) and about 163 μm, between about 35 μm and about 85 μm, between about 39 μm and about 68 μm, and/or between about 35 μm and about 44 μm (i.e., between about 0.00137 inches and about 0.0064 inches, between about 0.00137 inches and about 0.0033 inches, between about 0.0015 inches and about 0.00267 inches, and/or between about 0.00137 inches and about 0.0017 inches). As used in the previous context only, the term "about" means plus or minus ten percent of the associated value.

Figure 3:
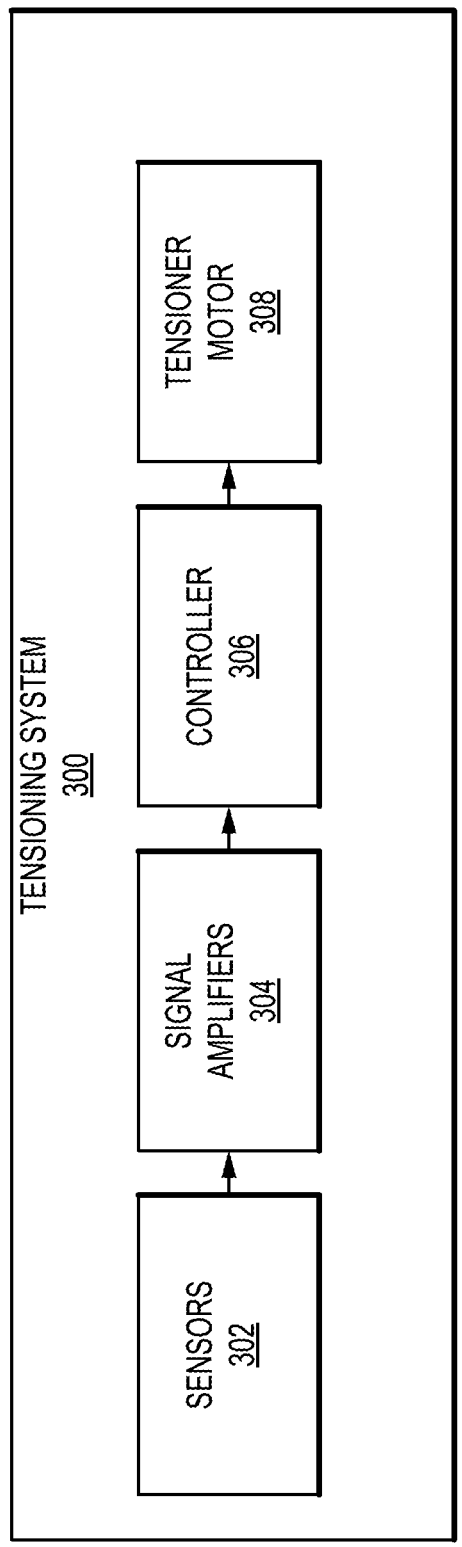
FIG. 3 illustrates a system for controlling individual tensions of textile material in respective zones when forming a preform, in accordance with various embodiments.

Turning to FIG. 3, in accordance with various embodiments, a system for controlling individual tensions of textile material, such as textile layers 202 of FIG. 2B, in respective zones when forming a preform is illustrated. The system 300 may include a set of sensors 302, a set of signal amplifiers 304, a controller 306, and a set of tensioner motors 308. In various embodiments, as textile material is loaded into the preform forming machinery, each textile material is routed through a respective double bar tensioner coupled to respective one of the set of tensioner motors 308. In various embodiments, the system uses a positioning frame as a cantilever such that each textile material changes direction just prior to entering the preform forming machine by an angle that allows each textile material to compress an associated one of the set of sensors 302. In various embodiments, each sensor in the set of sensors 302 may be a load cell, strain gauge, among others. In various embodiments, the angle may be between 75 degrees and 105 degrees. In various embodiments, the angle may be within 85 degrees and 95 degrees. In various embodiments, the angle may be substantially 90 degrees. The terms "substantially," "about," or "approximately" as used herein represent an amount close to the stated amount that still performs a desired function or achieves a desired result. For example, the term "substantially," "about," or "approximately" may refer to an amount that is within 5 degrees, within 3 degrees, within 2 degrees, or within 1 degree of a stated amount or value.

In various embodiments, as the preform forming machinery starts up, the textile material is pulled into the preform forming machinery by an inlet roller. In various embodiments, the textile material passes over a front bar or a structure associated with the front bar at the previously described angle compressing the front bar toward a back bar. In various embodiments, the textile material passes over the back bar or a structure associated with the back bar at the previously described angle compressing the back bar toward the front bar. In various embodiments, for each material, an associated sensor in the set of sensors 302 is located between the front bar and the back bar. In various embodiments, the sensor in the set of sensors 302, when a desired compressive force is detected, sends a signal to a respective signal amplifier in the set of signal amplifiers 304. In various embodiments, a desired compressive force may be between 10 and 200 pounds (lbs.). In various embodiments, the desired compressive force may be between 30 and 150 pounds (lbs.). In various embodiments, the desired compressive force may be between 50 and 100 pounds (lbs.). In various embodiments, the desired compressive force may be between 70 and 80 pounds (lbs.). In various embodiments, each signal amplifier in the set of signal amplifiers 304 amplifies or converts the signal received from the respective sensor of the set of sensors 302 into a signal recognizable by the controller 306.

The controller 306 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 306 may further include any non-transitory memory known in the art. The memory may store instructions usable by the controller 306 to perform operations as described herein. In various embodiments, where the controller 306 is an analog controller and where the received signal is an analog signal, the signal amplifier amplifies the signal recognizable by the controller 306. In various embodiments, where the controller 306 is an analog controller and where the received signal is a digital signal, the signal amplifier may include a digital-to-analog converter that converts the digital signal to an analog signal and then the signal amplifier amplifies the signal recognizable by the controller 306. In various embodiments, where the controller 306 is a digital controller and the receive signal is a digital signal, the signal amplifier may be omitted and the digital signal is sent directly to the controller 306. In various embodiments, where the controller 306 is a digital controller and the receive signal is an analog signal, an analog-to-digital converter may be provided that converts the analog signal to a digital signal that is then sent to the controller 306.

In various embodiments, the controller 306 compares the received signal to a predetermined tension setpoint. In various embodiments, the controller 306 utilizes respective tension setpoints for each textile material that is used to form the preform. In that regard, in various embodiments, one tension setpoint of one textile material may differ from another tension setpoint of another textile material. Likewise, in various embodiments, the tension setpoint of one textile material may be the same as a tension setpoint of another textile material. In various embodiment, if the controller 306 determines that the received signal fails to be within a range of the associated tension setpoint, then the controller sends a signal to the associated tensioner motor in the set of tensioner motors 308 to either increase tension or decrease tension using the associated double bar tensioner. In various embodiments, the tensioner motor may rotate the associated double bar tensioner along a central axis in a clockwise direction to increase tension and in a counterclockwise direction to decrease tension, depending on implementation. In various embodiment, the tensioner motor may rotate the associated double bar tensioner along the central axis in a counterclockwise direction to increase tension and in a clockwise direction to decrease tension, depending on implementation.

Figure 4:
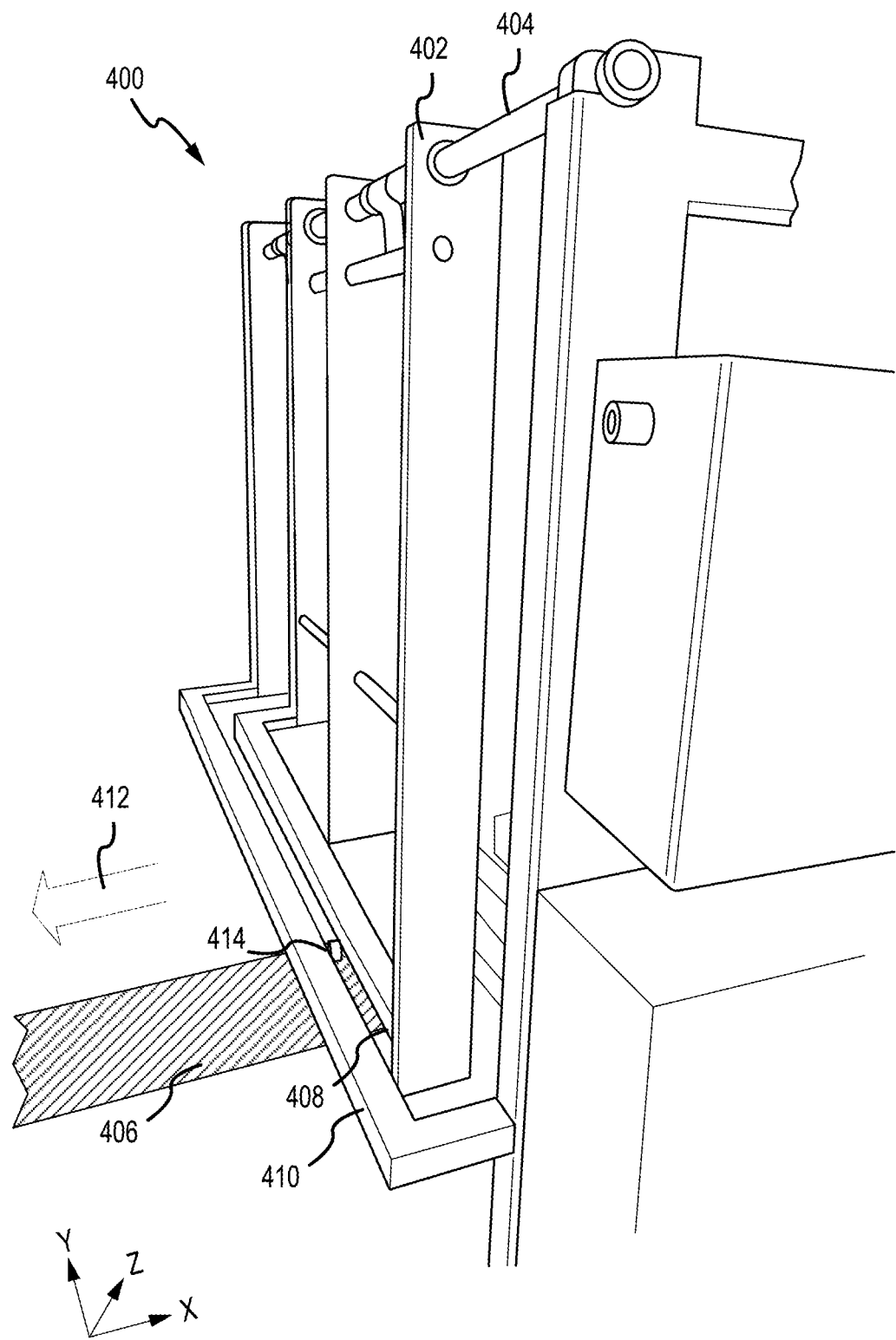
FIG. 4 illustrates a front structure of a preform forming machine, in accordance with various embodiments.

Turning to FIG. 4, in accordance with various embodiments, a front structure 400 of a preform forming machine is illustrated. In various embodiments, the front structure 400, along the x-axis, includes a cantilever carriage 402 mounted on support structure 404. In various embodiments, the textile material 406 exits the front structure 400 at the bottom where the textile material 406 changes direction by the previously described angle around a lower structure, i.e., a circular bar 502, illustrated in FIG. 5, associated with the cantilever carriage 402, such that the textile material 406 travels in a downward direction, i.e., a negative y-direction, around the lower structure, and then in a negative x-direction after changing direction, as indicated by arrow 412. In various embodiments, as the textile material 406 passes over the lower structure associated with the cantilever carriage 402, a compression force is applied by moving the lower portion of the cantilever carriage 402 and the back bar 408 mounted to the cantilever carriage 402 toward a front bar 410. In various embodiments, sensor 414 is mounted between the back bar 408 and, as the bottom of the cantilever carriage 402 is forced forward by the textile material 406 toward the front bar 410, the sensor 414 detects the compressive force which is then sent to a controller, such as controller 306 through signal amplifier 304 shown in FIG. 3, as a signal. In various embodiments, the signal may be either an analog signal or a digital signal.

Figure 5:
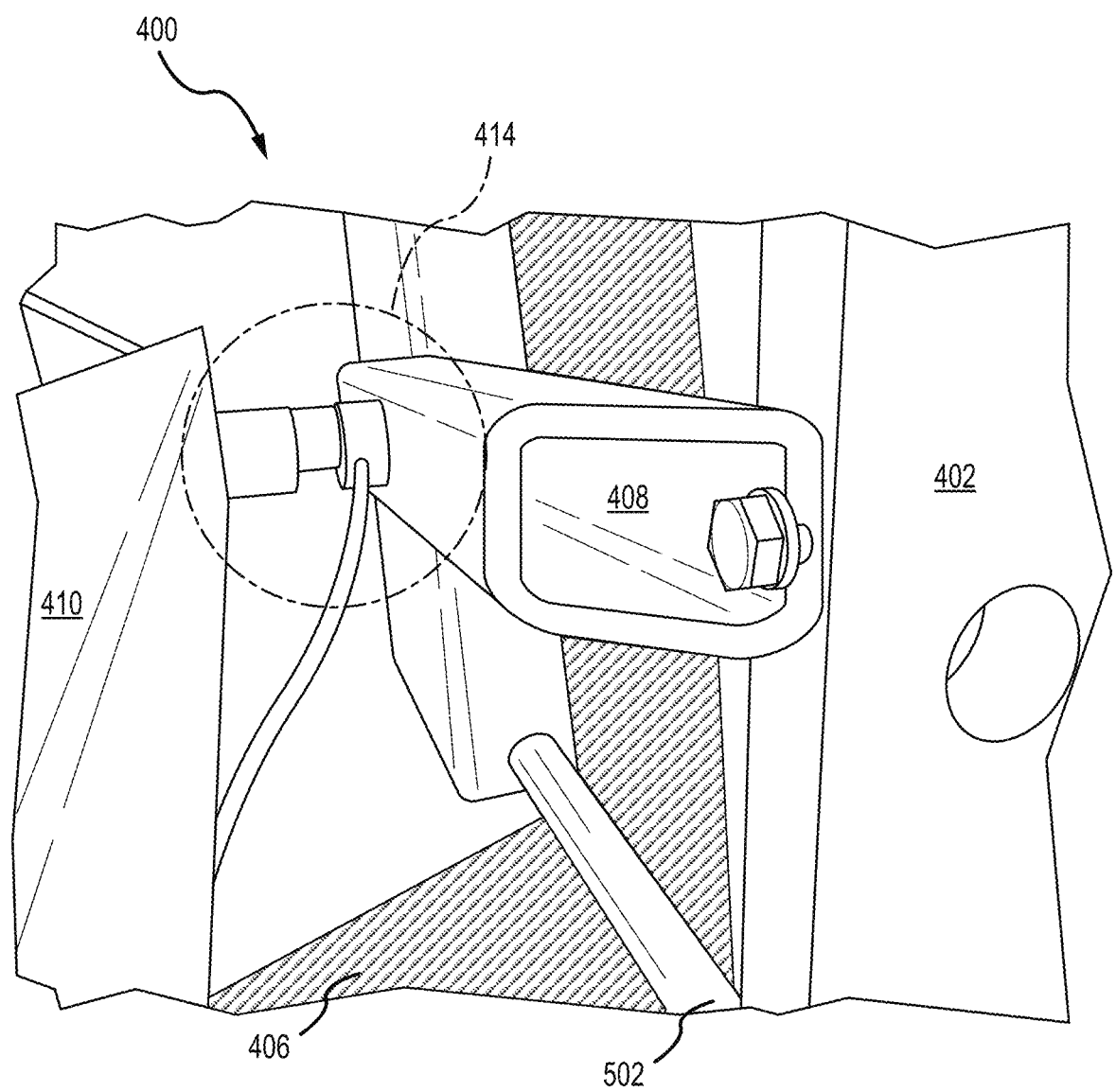
FIG. 5 illustrates a portion of the front structure of a preform forming machine, in accordance with various embodiments.

Turning to FIG. 5, in accordance with various embodiments, a portion of the front structure 400 of a preform forming machine is illustrated. In various embodiments, as the textile material 406 passes the back bar 408 or, as depicted, a circular bar 502 associated with the back bar 408, support structure 404 to which both the back bar 408 and the circular bar 502 are coupled traverses toward front bar 410 applying a compressive force to the front bar 410. In various embodiments, sensor 414 mounted between the back bar 408 and the front bar 410 detects the compressive force which is then sent to a controller as a signal. In that regard, in various embodiments, sensor 414 measures a horizontal stress force. In various embodiments, the signal may be either an analog signal or a digital signal.

Figure 6:
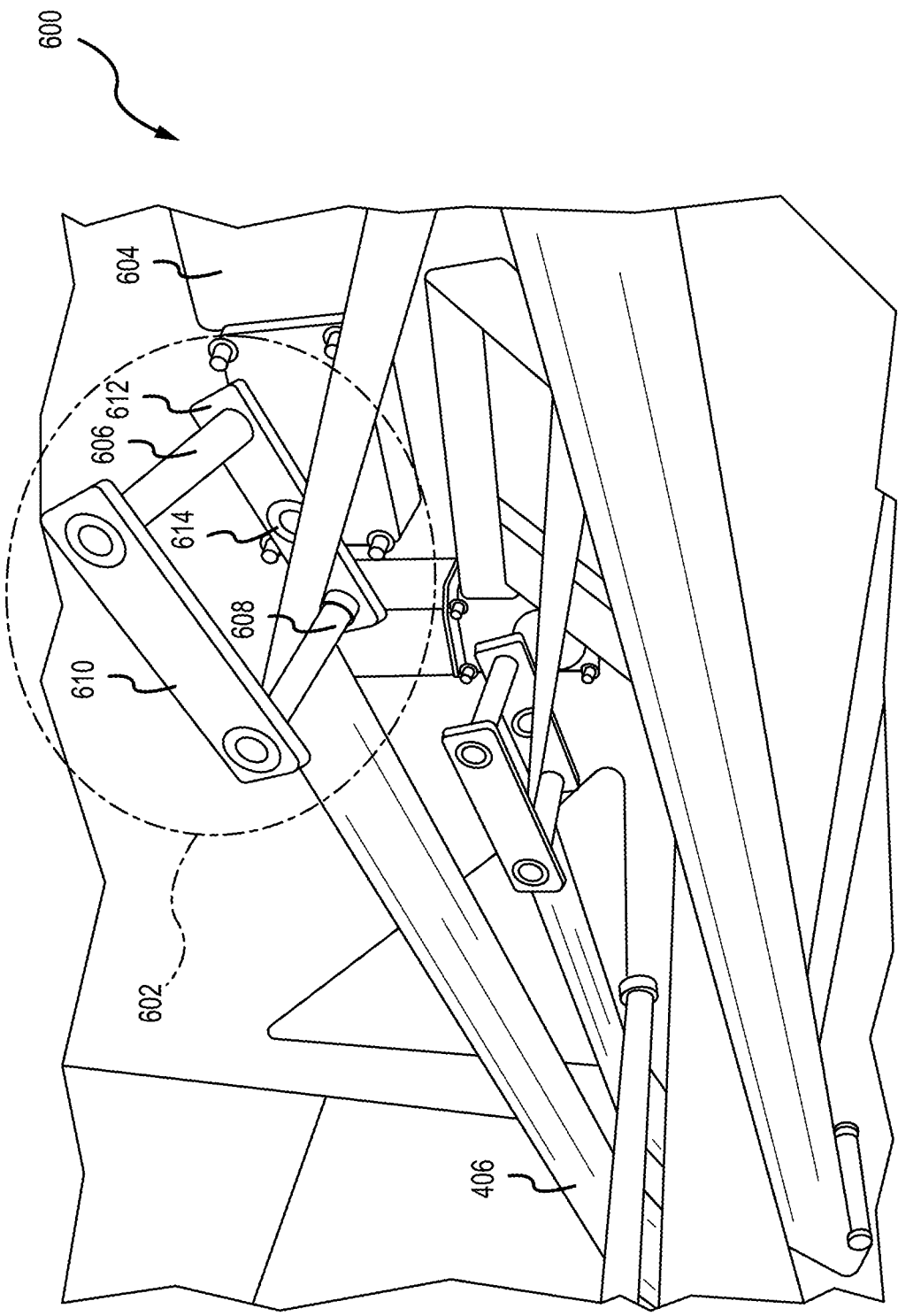
FIG. 6 illustrates a tensioning mechanism of a preform forming machine, in accordance with various embodiments.

Turning to FIG. 6, in accordance with various embodiments, a tensioning mechanism 600 of a preform forming machine is illustrated. As previously described, in various embodiments, as textile material 406 is loaded into the preform forming machine, the textile material 406 is routed through a respective double bar tensioner 602 coupled to a respective tensioner motor 604, such as one of the set of tensioner motors 308 of FIG. 3. In various embodiments, the double bar tensioner 602 includes a first cylindrically shaped portion 606 and a second cylindrically shaped portion 608. In various embodiments, a first end of the first cylindrically shaped portion 606 and a first end of the second cylindrically shaped portion 608 are coupled to a first side structure 610. In various embodiments, a second end of the first cylindrically shaped portion 606 and a second end of the second cylindrically shaped portion 608 are coupled to a second side structure 612. In various embodiments, the first cylindrically shaped portion 606 and the second cylindrically shaped portion 608 are separated by a first distance. In various embodiments, the first side structure 610 and the second side structure 612 are separated by a second distance. In various embodiments, the first cylindrically shaped portion 606 and the second cylindrically shaped portion 608 are substantially perpendicular to the first side structure 610 and the second side structure 612. In various embodiment, the term "substantially," as used herein, represents an amount close to the stated amount that still performs a desired function or achieves a desired result. For example, the term "substantially" may refer to an amount that is within 10% of, within 5% of, within 1% of, within 0.1% of, and within 0.01% of a stated amount or value.

In various embodiments, as illustrated, tensioner motor 604 may be mounted to the preform forming machine substantially horizontally. In various embodiments, tensioner motor 604 may be mounted to the preform forming machine substantially vertically. In various embodiments, tensioner motor 604 may be mounted to the preform forming machine at an angle that differs from a horizontal or vertical angle. In various embodiments, as illustrated, the tensioner motor 604 may be coupled to an outside of the second side structure 612 of the double bar tensioner 602 such that the tensioner motor 604 is at substantially a 90-degree angle to the second side structure 612. In various embodiments, the tensioner motor 604 may be coupled to an outside of the second side structure 612 of the double bar tensioner 602 such that the tensioner motor 604 is at substantially a 180-degree angle to the second side structure 612. In various embodiments, tensioner motor 604 may be coupled to an outside of the second side structure 612 of the double bar tensioner 602 at substantially a center 614 of the second side structure 612. In that regard, in various embodiments, when the controller sends a signal to the tensioner motor 604 to either increase tension or decrease tension using the associated double bar tensioner, the tensioner motor 604 may rotate the double bar tensioner 602 in a clockwise direction along a central axis between the first cylindrically shaped portion 606 and the second cylindrically shaped portion 608 to increase tension and in a counterclockwise direction to decrease tension, depending on implementation. In various embodiments, in response to the controller sending a signal to the tensioner motor 604 to either increase tension or decrease tension using the associated double bar tensioner, the tensioner motor 604 may rotate the double bar tensioner 602 in a counterclockwise direction to increase tension and in a clockwise direction to decrease tension, depending on implementation.

Figure 7:
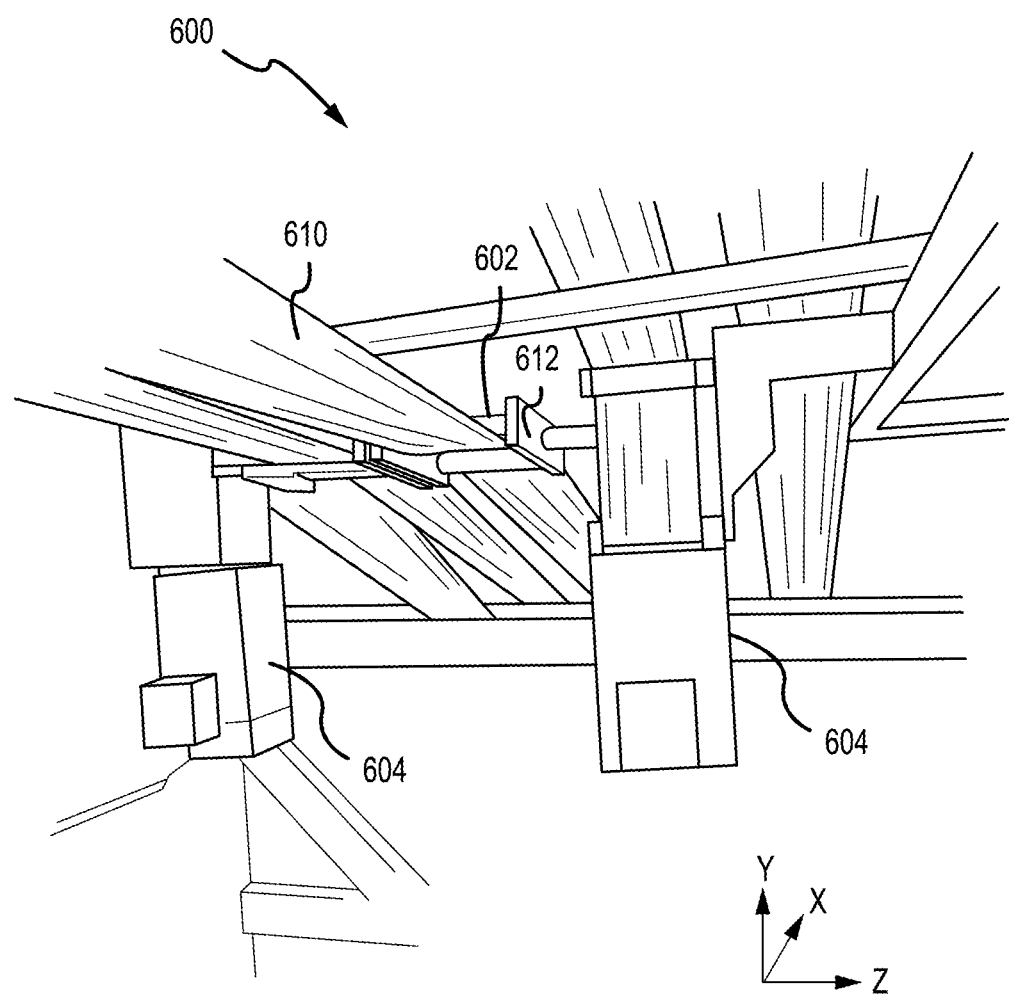
FIG. 7 illustrates a tensioning mechanism of a preform forming machine, in accordance with various embodiments.

Turning to FIG. 7, in accordance with various embodiments, a tensioning mechanism 600 of a preform forming machine is illustrated. In various embodiment, as described previously, tensioner motor 604 may be mounted to the preform forming machine substantially horizontally, i.e., in an x direction. In various embodiments, as illustrated, tensioner motor 604 may be mounted to the preform forming machine substantially vertically, i.e., in a y-direction. In various embodiments, tensioner motor 604 may be mounted to the preform forming machine at an angle that differs from a horizontal or vertical angle. In various embodiments, as illustrated, the tensioner motor 604 may be coupled to an outside of the second side structure 612 of the double bar tensioner 602 such that the tensioner motor 604 is at substantially a 90-degree angle to the second side structure 612. In various embodiments, the tensioner motor 604 may be coupled to an outside of the second side structure 612 of the double bar tensioner 602 such that the tensioner motor 604 is at substantially a 180-degree angle to the second side structure 612.

Figure 8:
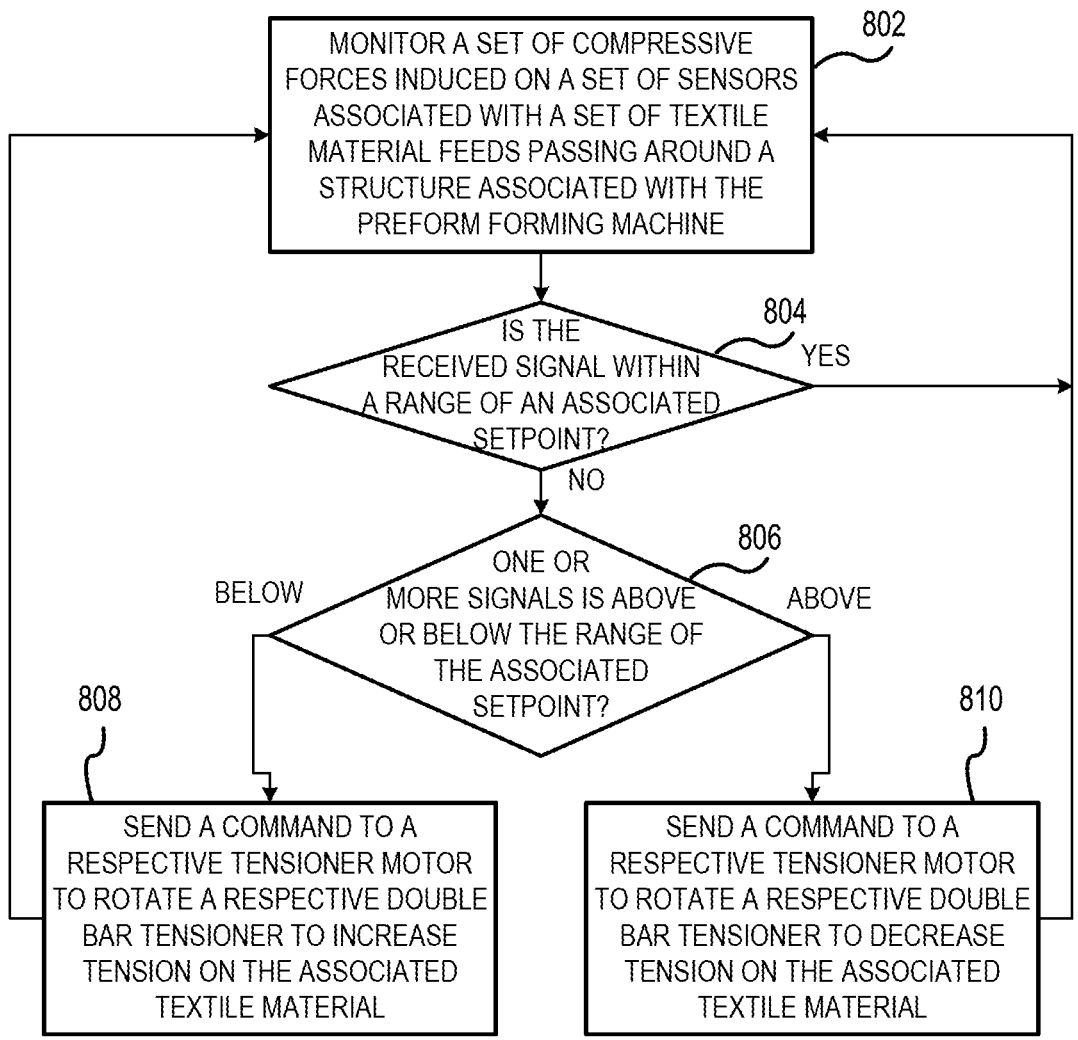
FIG. 8 illustrates a method for tensioning textile material being fed into a preform forming machine, in accordance with various embodiments.

Referring now to FIG. 8, in accordance with various embodiments, a method for tensioning textile material being fed into a preform forming machine is illustrated. For ease of description, the method 800 is described with reference to elements shown in FIGS. 1 thru 7. At block 802, the system 300 monitors a set of compressive forces induced on a set of sensors 302 associated with a set of textile material 406 feeds passing around a structure associated with the preform forming machine. At block 804, the system 300 evaluates the one or more signals to determine whether the received signal within a range of an associated tension setpoint. At block 806, if the one or more signals is outside the range of the associated tension setpoint, i.e., below, indicating more tension should be applied, then, at block 808, the system 300 may send a command to a respective tensioner motor 308, 604 to rotate a respective double bar tensioner 602 to increase tension on the associated textile material 406. At block 806, if the one or more signals is outside the range of the associated tension setpoint, i.e., above, indicating less tension should be applied, then, at block 810, the system 300 may send a command to a respective tensioner motor 308, 604 to rotate a respective double bar tensioner 602 to decrease tension on the associated textile material 406.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about," or "approximately" as used herein represent an amount close to the stated amount that still performs a desired function or achieves a desired result. For example, the term "substantially," "about," or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A system for controlling tension on textile material used in forming a preform, the system comprising:
    a sensor; and
    a controller, wherein the controller is configured to:
        receive a signal, from the sensor, indicative of a compressive force applied by the textile material feeding into the system;
        determine whether the compressive force is within range of a setpoint of the tension for the textile material; and
        responsive to the compressive force being outside the range, send a command of at least one of an increase or a decrease of the tension on the textile material,
        wherein the sensor is located between a front bar and a back bar of a forming machine and wherein the compressive force is applied by the textile material acting on at least one of the back bar, the front bar, a structure associated with the back bar, or a structure associated with the front bar.

2. The system of claim 1, wherein the sensor is at least one of a load cell or a strain gauge.

3. The system of claim 1, further comprising:
    a double bar tensioner, wherein the tension is provided by the double bar tensioner.

4. The system of claim 3, wherein the double bar tensioner comprises a first cylindrically shaped portion and a second cylindrically shaped portion, wherein a first end of the first cylindrically shaped portion and a first end of the second cylindrically shaped portion are coupled to a first side structure, and wherein a second end of the first cylindrically shaped portion and a second end of the second cylindrically shaped portion are coupled to a second side structure.

5. The system of claim 4, further comprising:
    a tensioner motor, wherein the double bar tensioner is coupled to the tensioner motor and wherein the tensioner motor rotates the double bar tensioner along a central axis between the first cylindrically shaped portion and the second cylindrically shaped portion to either increase or decrease the tension on the textile material.

6. The system of claim 5, wherein rotating the double bar tensioner clockwise along the central axis increases the tension on the textile material and wherein rotating the double bar tensioner counterclockwise along the central axis decreases the tension on the textile material.

7. The system of claim 5, wherein rotating the double bar tensioner counterclockwise along the central axis increases the tension on the textile material and wherein rotating the double bar tensioner clockwise along the central axis decreases the tension on the textile material.

8. The system of claim 1, further comprising:
    a signal amplifier, wherein the signal is an analog signal and wherein the signal amplifier amplifies the analog signal prior to being received by the controller.

9. The system of claim 1, further comprising:
    a digital-to-analog converter; and
    a signal amplifier, wherein the signal is a digital signal, wherein the digital-to-analog converter converts the digital signal to an analog signal, and wherein signal amplifier amplifies the analog signal prior to being received by the controller.

10. A method for controlling tension on textile material used in forming a product, comprising:
  receiving, by a controller, a signal from a sensor indicative of a compressive force applied by the textile material feeding into a forming machine;
  determining, by the controller, whether the compressive force is within range of a setpoint of a tension for the textile material; and
  responsive to the compressive force being outside the range, sending, by the controller, a command of at least one of an increase or a decrease of the tension on the textile material,
  wherein the sensor is located between a front bar and a back bar of the forming machine and wherein the compressive force is applied by the textile material acting on at least one of the back bar, the front bar, a structure associated with the back bar, or a structure associated with the front bar.

11. The method of claim 10, wherein the sensor is at least one of a load cell or a strain gauge.

12. The method of claim 10, wherein the tension is provided by a double bar tensioner.

13. The method of claim 12, wherein the double bar tensioner comprises a first cylindrically shaped portion and a second cylindrically shaped portion, wherein a first end of the first cylindrically shaped portion and a first end of the second cylindrically shaped portion are coupled to a first side structure, and wherein a second end of the first cylindrically shaped portion and a second end of the second cylindrically shaped portion are coupled to a second side structure.

14. The method of claim 13, wherein the double bar tensioner is coupled to a tensioner motor and wherein the tensioner motor rotates the double bar tensioner along a central axis between the first cylindrically shaped portion and the second cylindrically shaped portion to either increase or decrease the tension on the textile material.

15. The method of claim 14, wherein rotating the double bar tensioner clockwise along the central axis increases the tension on the textile material and wherein rotating the double bar tensioner counterclockwise along the central axis decreases the tension on the textile material.

16. The method of claim 14, wherein rotating the double bar tensioner counterclockwise along the central axis increases the tension on the textile material and wherein rotating the double bar tensioner clockwise along the central axis decreases the tension on the textile material.

17. The method of claim 10, wherein the signal is an analog signal and wherein the analog signal is amplified prior to being received by the controller.

18. The method of claim 10, wherein the signal is a digital signal and wherein the digital signal is converted to an analog signal and then amplified prior to being received by the controller.

* * * * *